(12) United States Patent
Stewart et al.

(10) Patent No.: US 7,324,103 B2
(45) Date of Patent: Jan. 29, 2008

(54) SYSTEM AND METHOD OF DIRECT MESH MANIPULATION

(75) Inventors: Paul Joseph Stewart, Ann Arbor, MI (US); Anne Marsan, Ann Arbor, MI (US); Yifan Chen, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 990 days.

(21) Appl. No.: 10/020,362

(22) Filed: Oct. 30, 2001

(65) Prior Publication Data

US 2003/0080957 A1 May 1, 2003

(51) Int. Cl.
*G06T 17/00* (2006.01)

(52) U.S. Cl. .......................... 345/420; 345/419; 703/8; 700/98; 700/182; 715/964

(58) Field of Classification Search ................ 345/419, 345/420, 423, 427, 619, 622, 652, 664, 665; 703/8; 700/98, 182; 715/964
See application file for complete search history.

(56) References Cited

U.S. PATENT DOCUMENTS

| | | | | |
|---|---|---|---|---|
| 4,821,214 | A * | 4/1989 | Sederberg | 345/420 |
| 5,119,309 | A | 6/1992 | Cavendish et al. | 364/474.24 |
| 5,179,644 | A | 1/1993 | Chiyokura et al. | 395/141 |
| 5,253,331 | A | 10/1993 | Lorenzen et al. | 395/50 |
| 5,315,537 | A * | 5/1994 | Blacker | 716/20 |
| 5,504,845 | A | 4/1996 | Vecchione | 395/119 |
| 5,903,458 | A | 5/1999 | Stewart et al. | 364/468.04 |
| 5,923,329 | A * | 7/1999 | Beale | 345/418 |
| 6,578,189 | B2 * | 6/2003 | Hariya et al. | 716/20 |

OTHER PUBLICATIONS

Yifan Chen, Paul Stewart and Pietro Buttolo, "A Real-Time, Interactive Method for Fast Modification of Large-Scale CAE Mesh Models," ASME 2000 Design Engineering Technical Conferences and Computers and Information in Engineering Conference, Sep. 10-13, 2000.

(Continued)

*Primary Examiner*—Kimbinh T. Nguyen
(74) *Attorney, Agent, or Firm*—Gary Smith

(57) ABSTRACT

A system and method for computer-aided engineering analysis using direct mesh manipulation of a mesh model is provided. The system includes a computer system having a memory, a processor, a user input device and a display device. The method includes the steps of selecting a geometric model in a computer-aided design (CAD) format, converting the CAD model into a mesh model and evaluating the mesh model using a computer-aided engineering (CAE) analysis. The method also includes the steps of modifying a surface of the mesh model by varying a predetermined parameter using direct surface manipulation (DSM), updating the mesh model and using the updated mesh model in further CAE analysis. Three techniques are provided for modifying a surface feature, including using a Dirichlet parameter distribution to determine the displacement of the surface feature; modeling the surface feature as an elastic sheet to determine deformation; and enclosing the feature within a lattice structure and using lattice deformation to determine surface deformation.

18 Claims, 5 Drawing Sheets

OTHER PUBLICATIONS

Bloor, M.I.G. and M.J. Wilson, 1989, "Blend Design as a Boundary-Value Problem," Theory and Practice of Geometric Modeling, W. Staber and H.P. Seidel, eds., Springer-Verlag, Berlin.

Ceiniker, G. and D. Gossard, 1989, "Energy-Based Models for Free-Form Surface Shape Design," Proceedings of the ASME 1989 Design Automation Conference, Sep. 17-21, Montreal, QC, Canada.

Ceiniker, G. and D. Gossard, 1991, "Deformable Curve and Surface Finite-Elements for Free-Form Shape Design," Computer Graphics, 25(4):257-266.

Sederberg, T.W. and S.R. Parry, 1986, "Free-Form Deformation of Solid Geometric Models," Proceedings of the ACM SIGGRAPH, Computer Graphics 20(4):151-160.

Stewart, P.J., 1991, "Direct Shape Control of Free-Form Curves and Surfaces with Generalized Basis Functions," Ph.D. Dissertation, The University of Michigan, Ann Arbor.

Stewart, P.J. and Y. Chen , 1999, "Geometric Features Applied to Composite Surfaces Using Spherical Reparameterization," Proceedings of the ASME 1999 Design Engineering Technical Conferences, Sep. 12-15, Las Vegas, NV.

Terzopoulos, D. and H. Qin, 1994, "Dynamic NURBS with Geometric Constraints for Interactive Sculpting," ACM Transactions on Graphics, 13(2):103-136.

Marsan, Anne L., Yifan Chen, Paul Stewart, 2001, "A Finite Element Approach to Direct Surface Manipulation," Proceedings of ASME 2001 Design Engineering Technical Conference and Computers and Information in Engineering Conference, Sep. 9-12, Pittsburgh, PA.

Harzheim, L., G. Graf and J. Lieber, 1997, "Shape200: A Program to Create Basis Vectors for Shape Optimization Using Solution 200 of MSC/Nastran," Society of Automotive Engineers, Inc., pp. 219-228.

Terzopoulos, D. and A. Witkin, 1988, "Deformable Models, Physically Based Models with Rigid and Deformable Components," IEEE Computer Graphics & Applications, Nov. 1988, pp. 41-51.

Qin, H. and D. Terzopoulos, 1996, "D-NURBS: A Physics-Based Framework for Geometric Design," IEEE Transactions in Visualization Computer Graphics, Mar. 1996, 2(1):85-96.

MIG Bloor and M J Wilson, "Using Partial Differential Equations to Generate Free-Form Surfaces", Computer-Aided Design, vol. 22, No. 4, May 1990, pp. 202-212.

* cited by examiner

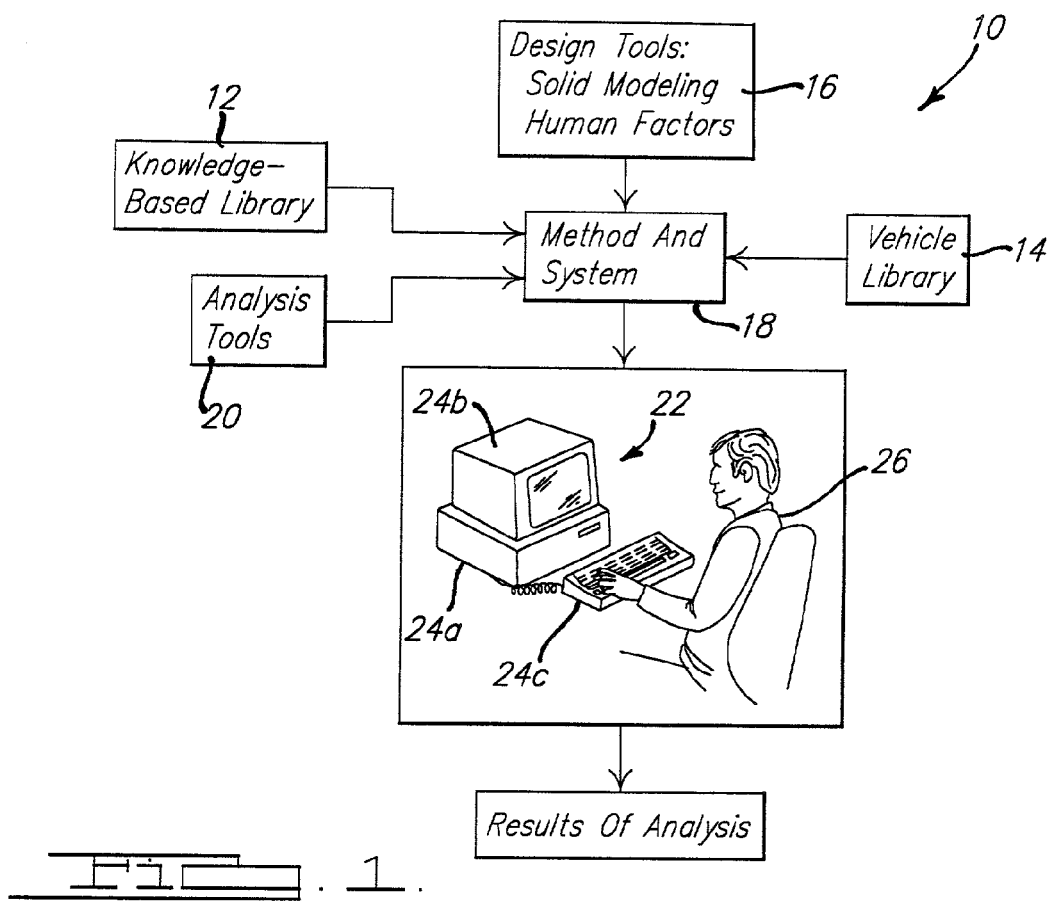
FIG. 1.
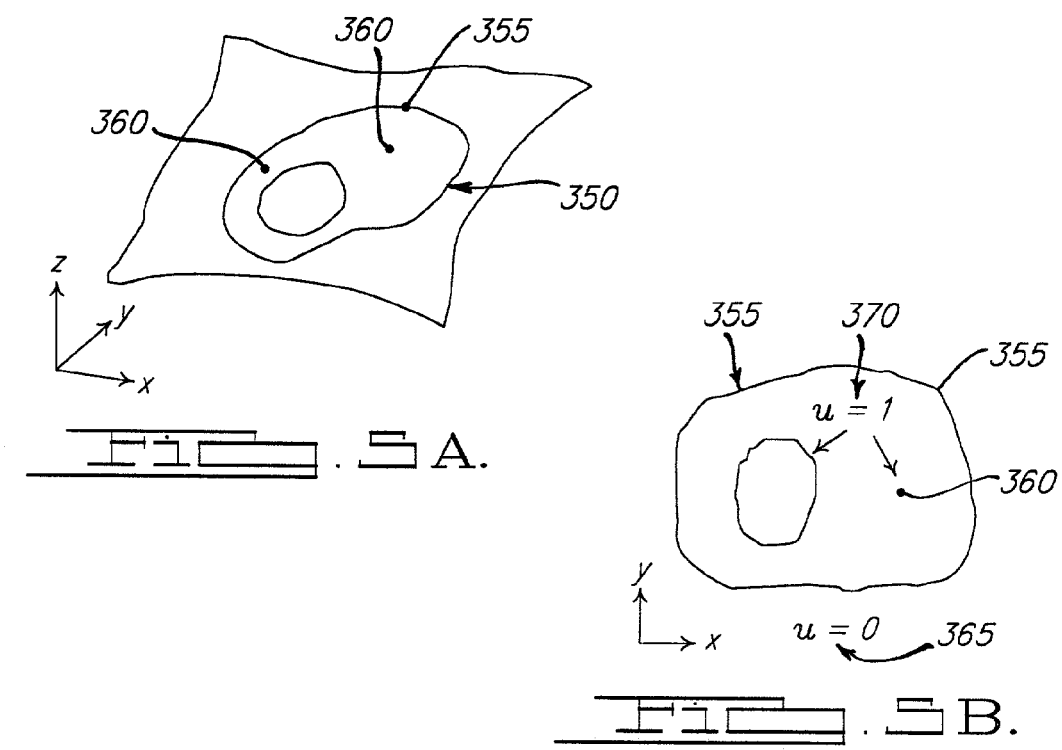
FIG. 5A.
FIG. 5B.

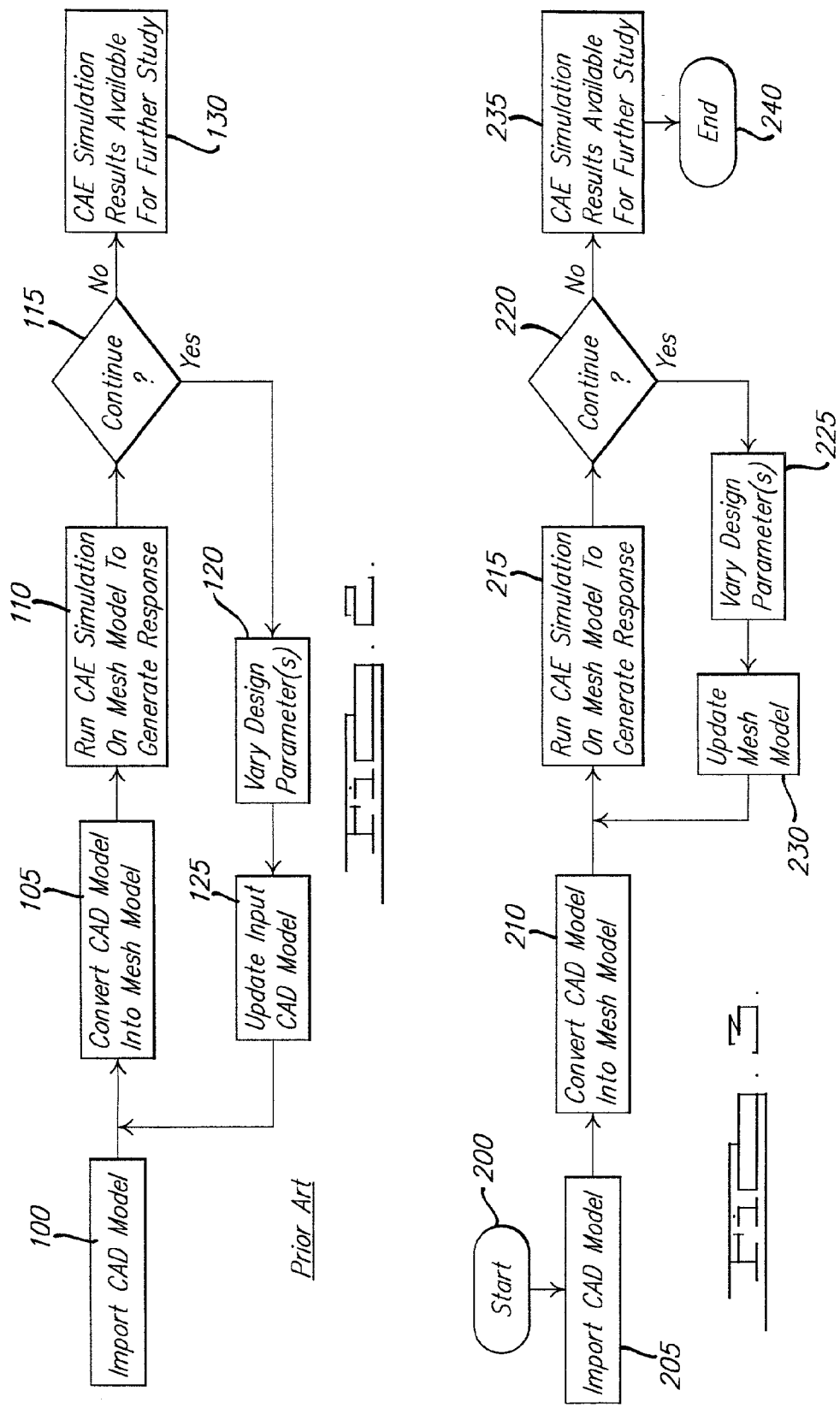

SYSTEM AND METHOD OF DIRECT MESH MANIPULATION

BACKGROUND OF THE INVENTION

1. Field of the Invention

The present invention relates generally to computer-assisted design of vehicles and, more specifically, to a system and method of direct manipulation of a mesh model in the computer-assisted design of a vehicle.

2. Description of the Related Art

Vehicle design, and in particular the design of an automotive vehicle, has advanced to a state in which computer-assisted design techniques are frequently incorporated in the development of a new vehicle, or redesign of an existing vehicle. At the same time, enhanced visualization software tools have been developed that allow for interactive display and manipulation of large geometric models, including models developed using computer-aided design (CAD), such as a vehicle model. In the field of vehicle design, the combined use of computer-aided design and visualization techniques are especially beneficial in designing, packaging and assembling the various systems incorporated within the vehicle, to maximize the design and functional capabilities of these vehicles. Advantageously, potential vehicle system designs can be considered in a timely and cost-effective manner by analyzing a digital representation of a proposed design, versus preparing an actual vehicle model.

One aspect of the design process is to construct a geometric model of the proposed design using a technique known as computer-aided design (CAD). Another aspect of the design process is the use of mathematical tools, collectively referred to as computer-aided engineering (CAE), to constrain and guide the designer in evaluating the design. The use of a CAE simulation allows for verification of a design intent and a prediction of a mechanical behavior of the design, including its systems, subsystems and components. CAE simulations are advantageous in particular types of vehicle analysis, such as vehicle safety analysis and structural analysis. Examples of CAE techniques include finite element analysis (FEA) and computational fluid dynamics (CFD). Recent enhancements to the computing power of modem computers has resulted in a reduction in the amount of time required to perform an analysis, such as a CAE simulation. Therefore, CAE tools can be utilized earlier in the product development process and applied to a wider range of product development activities.

Another example of a product development activity that has benefited from enhanced CAE computational capabilities is Design of Experiments (DOE). DOE is an engineering design practice that enables a designer to conduct a series of tests corresponding to variations in a set of predetermined design parameters. One benefit of a DOE simulation is that a test that in the past would require a physical experiment on a physical prototype, can now be performed using a CAE simulation and a geometric model. As a result, the DOE can be conducted in an early phase of the product development process, and proposed modifications to the design can be expeditiously analyzed. For example, an airflow DOE provides aerodynamic information regarding the exterior shape of the vehicle for use in the design of the exterior shape of a vehicle. CFD is utilized to calculate aerodynamic properties, ranging from drag and lift coefficients to wind-noise characteristics, in response to a set of vehicle exterior shape parameters. Since the CFD simulation uses a geometric model of the vehicle, the airflow DOE can be performed early in the design process, before a physical prototype is built.

As is currently known in the art, a CAE simulation, such as a DOE, begins with a CAD model of a particular design, such as the exterior shape of the vehicle. The CAD model is converted into a mesh model, which is a tessellated approximation of an object's surface, known as a finite element mesh. A simulation, such as a CFD analysis, is performed on the mesh model, to generate a response of the system. Based on the response obtained in the CFD analysis, a system parameter is modified. The CAD model is updated in light of the modified system parameters. However, modifying the CAD model in a CAD system is a very time-consuming task that is performed each time a change is made to the system parameter set. Also, the use of a CAD system in updating a mesh model is a time consuming and costly process, since CAD systems generally require significant overhead, including user background, experience and training. Thus, there is a need in the art for a system and method of direct mesh manipulation of a mesh model using mathematical techniques to eliminate the need to update the CAD model each time a design parameter is modified.

SUMMARY OF THE INVENTION

Accordingly, the present invention is a system and method of direct mesh manipulation of a mesh model. A system and method for computer-aided engineering analysis using direct mesh manipulation of a mesh model is provided. The system includes a computer system having a memory, a processor, a user input device and a display device. The method includes the steps of selecting a geometric model in a computer-aided design (CAD) format, converting the CAD model into a mesh model and evaluating the mesh model using a computer-aided engineering (CAE) analysis. The method also includes the steps of modifying a surface of the mesh model by varying a predetermined parameter using direct surface manipulation (DSM), updating the mesh model and using the updated mesh model in further CAE analysis. Three techniques are provided for modifying a surface feature, including using a Dirichlet parameter distribution to determine the displacement of the surface feature; modeling the surface feature as an elastic sheet to determine deformation; and enclosing the feature within a lattice structure and using lattice deformation to determine surface deformation.

One advantage of the present invention is that a system and method of direct mesh manipulation of a mesh model is provided that provides for verification of design intent and prediction of mechanical behavior of the model early in the design process. Another advantage of the present invention is that a system and method is provided that replaces a physical experiment on a physical prototype with a computer aided engineering simulation using a computer model. Still anther advantage of the present invention is that a design parameter is expeditiously modified and analyzed. Yet another advantage of the present invention is that the design parameter is varied and that the mesh model is updated using Direct Mesh Manipulation (DMM), instead of varying the design parameter, updating the CAD model, and converting the updated CAD model to a mesh model.

A further advantage of the present invention is that direct mesh manipulation uses a Dirichlet parameter distribution to determine deformation of the surface feature. Still a further advantage of the present invention is that the DMM models the surface as a linear elastic sheet and uses finite element analysis to solve for deformation of the surface. Yet a further advantage of the present invention is that the DMM uses lattice deformation techniques to deform the surface feature.

Other features and advantages of the present invention will be readily appreciated, as the same becomes better understood after reading the subsequent description taken in conjunction with the accompanying drawings.

BRIEF DESCRIPTION OF THE DRAWINGS

FIG. 1 is a diagrammatic view of a system for use in conjunction with a method of direct mesh manipulation of a mesh model, according to the present invention.

FIG. 2 is a diagrammatic view illustrating a prior art process of conducting a Design of Experiment using DMM.

FIG. 3 is a diagrammatic view illustrating a Design of Experiment using direct mesh manipulation of a mesh model, according to the present invention, and using the system of FIG. 1.

FIGS. 6A–6C are diagrammatic views illustrating direct mesh manipulation of a surface feature using the method of FIG. 4A, according to the present invention.

DESCRIPTION OF THE PREFERRED EMBODIMENT(S)

Figures 4A, 4C:
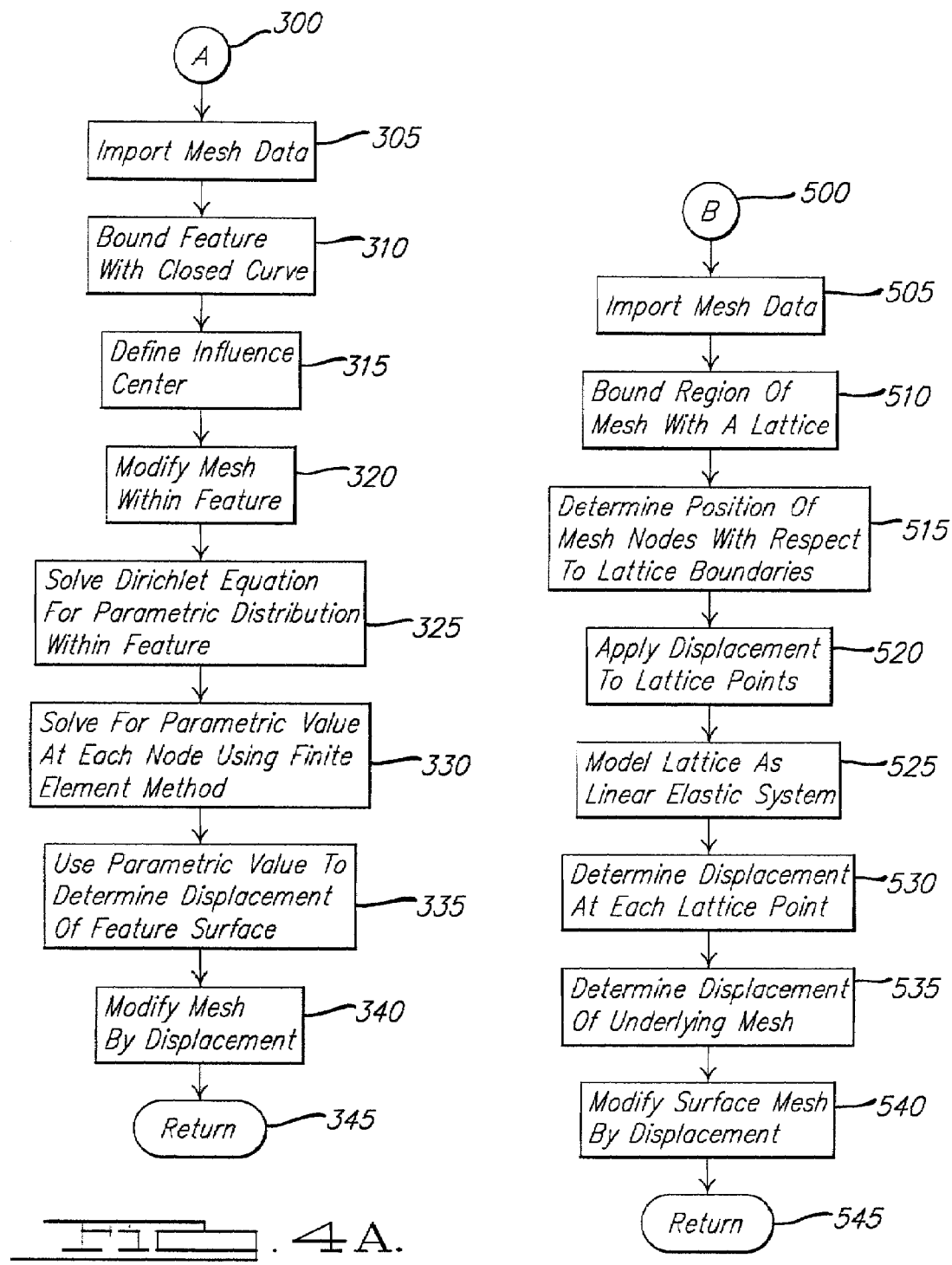
FIGS. 4A–C are flowcharts illustrating methods of direct mesh manipulation of a mesh model, for use with the Design of Experiments of FIG. 3, according to the present invention.

A design of a system, such as a vehicle, is achieved according to the present invention with a generic, parametric driven design process. Advantageously, this process allows for flexibility in vehicle design and engineering analysis of the design in a fraction of the time required using conventional design methods. Various computer-based tools are integrated to achieve this enormous time and expense savings, including solid modeling, parametric design, and automated studies.

In this example, the computer generated geometric model represents a design form for a vehicle, partially shown at 50. The vehicle design is typically generated through the use of conventional computer aided design (CAD), including computer aided manufacturing (CAM) and computer aided engineering (CAE) techniques.

Referring to the drawings and in particular to FIG. 1, a system 10 for direct mesh manipulation of a mesh model, which in this example is a vehicle 50, is illustrated graphically. The system 10 includes a knowledge-based engineering library 12 stored on an electronic storage device (not shown) that is operatively connected to a computer system 22, to be described. The knowledge-based engineering library 12 is a database of sub-libraries containing an electronic representation of data including various experts' knowledge of information relevant to the design of a product, such as the vehicle 50. The knowledge-based engineering library 12 may include information such as design, assembly and manufacturing rules and guidelines. The knowledge-based engineering library 12 may also contain data in electronic form regarding various types of vehicle subsystems. The knowledge-based engineering library 12 may further contain predetermined product assumptions regarding the vehicle 50 to be designed, such as model year, style, or production volume. The knowledge-based engineering library 12 may include a sub-library, such as a component parts library of particular component parts used on a vehicle.

The system 10 also includes a vehicle library 14 stored on the electronic storage device. The vehicle library 14 is an electrical representation of a vehicle model or a portion thereof. Advantageously, the vehicle library 14 may contain a geometric model of an exterior portion of a particular vehicle. The vehicle library 14 may include a direct mesh manipulation or DMM feature sub-library containing information regarding a particular DMM feature. It should be appreciated that the vehicle library 14 may be a sub-library of the knowledge-based engineering library 12.

The system 10 may also include various computer-aided design (CAD) tools 16, which can be used by the method, to be described. These design tools 16 may include solid modeling, visualization and parametric design techniques. Solid modeling, for example, takes electronically stored vehicle model data from the vehicle library 14 and standard component parts data from the knowledge-based engineering library 12 and builds complex geometry for part-to-part or full assembly analysis. Several modeling programs are commercially available and generally known to those skilled in the art.

The parametric design technique is used in the electronic construction of geometry within the computer system 22, for designing the vehicle 50 or a portion thereof. As a particular dimension or parameter is modified, the computer system 22 is instructed to regenerate a new geometry.

The system 10 also includes various computer-aided engineering (CAE) analysis tools 20. One example of a CAE analysis tool 20 is computational fluid dynamics (CFD). Another example of a CAE analysis tool 20 is finite element analysis (FEA). Several software programs are commercially available to perform these analyses and are generally known to those skilled in the art.

The system 10 includes a computer system 22, having a processor, a controller, and a memory shown at 24a to process information relevant to the method 18, for varying a design parameter using direct surface manipulation of a mesh model. The computer system 22 includes a display device 24b, such as a video terminal, to display a computer aided vehicle design.

In this example, information is displayed on the video terminal 24b in a series of screens, also referred to as a browser. A user 26 inputs information into the computer system 22 when prompted to do so. The information may represent different parameter alternatives. The set of parameters or the set of instructions may be specific to the method of direct surface manipulation of a mesh model, wherein other data and information non-specific to the method 18 may already be stored in the memory of the computer system 22. Selection and control of the information within a screen can be achieved by the user 26, via a user interactive device 24c, such as a keyboard or a mouse.

An example of an input method is a drawing technique used to draw a box around a local region of the model using the user interactive device 22c, such as the mouse. It should be appreciated that the drawing process includes a click, drag and release of the mouse, as is understood in the art. Another type of input method is a graphical user interface that allows menu selection, parameter modification and performs other types of viewing operations. Still another example of an input method is a pop-up dialog box containing available information or instructions. Preferably, the computer system 22 is configured to provide for fast display capability for rendering and viewing of complex and large mesh models.

The computer system 22 utilizes the set of information or instructions from the user 26, information from the libraries 12,14, design tools and analysis tools 20 and any other information in carrying out a method 18, according to the present invention and discussed in detail subsequently, using direct mesh manipulation of a mesh model.

Advantageously, this is a time and cost savings as compared to performing the same evaluation using a physical prototype. In addition, the computer-implemented method using direct mesh manipulation of a mesh model combines all of the foregoing to provide an efficient, flexible, rapid tool for evaluating the design of a vehicle. Furthermore, information obtained during the evaluation of the design is an output of the method as shown at 28 and is available for further analysis and study.

Referring to FIG. 2, an example of a prior art methodology for performing a CAE simulation is illustrated. A user 26 selects a CAD model to use in the simulation, as shown at block 100. In block 105, the methodology converts the CAD model into a geometric model suitable for CAE analysis. An example of a geometric model is a finite element mesh model of a vehicle 50. In block 110, a computer aided engineering (CAE) simulation is performed by the user using a predetermined set of parameters. For example, a DOE to test airflow around the exterior of the vehicle 50 utilizing an analytical technique referred to as computational fluid dynamics (CFD), is conducted to generate a response for a set of airflow DOE parameters, such as vehicle drag, lift coefficients and wind noise.

In diamond 115, the user 26 selects whether to continue the simulation. If the user 26 selects not to continue the simulation, in block 130 the results of the simulation, which in this example is the DOE analysis, are available for additional study and evaluation. If the user selects to continue the simulation, the methodology advances to block 120, where the user 26 modifies a design parameter based on the generated response for the particular set of design parameters being studied. In block 125, the methodology updates the CAD model in light of the modified design parameter. It should be appreciated that the user may perform several iterations of the CAE simulation using various sets of parameters. The methodology returns to block 105 and continues the CAE simulation by converting the updated CAD model into a model format suitable for CAE analysis.

A disadvantage of the prior art is that the step of modifying a CAD model is costly and time consuming to implement, since it must be performed each time a change is made to the set of DOE parameters. A CAD system requires a significant amount of overhead, including user time, training and experience. The cost and time associated with having to use a CAD system to update the mesh model detracts from the advantages associated with using a CAE simulation, such as in a DOE analysis.

Referring to FIG. 3 a method of performing a CAE simulation using direct mesh manipulation of a mesh model is illustrated. In this example, the CAE simulation is a DOE, as previously described. Advantageously, the use of direct mesh modeling expands and integrates a mathematical surface modeling technique referred to in the art as Direct Surface Manipulation, or DSM. With DSM, an entire surface feature is placed on an existing parametric surface as a single geometric entity. After the feature is created, a user 26 can control its location, shape and continuity independently by adjusting corresponding parameters. While this methodology works well for a simply connected feature with one influence center, it is less effective for a multiply connected feature. An example of a system and methodology for manipulating a mesh model using direct surface manipulation is disclosed in commonly assigned patent application Ser. No. 09/681,732, which is hereby incorporated by reference.

The methodology begins in block 200 and continues to block 205, and the user 26 selects a geometric model for performing a CAE simulation to assess the geometric properties of the model, and the model is imported into the methodology. Preferably, the model is a computer generated, computer-aided design (CAD) model, digital buck or other mathematical or geometric representation, that is maintained in a computer database such as the vehicle library 14, as previously described. The model is represented using a standard data format, such as a set of NURBS, a three-dimensional solid CSG or a polygonal soup. In this example, the model represents a vehicle, and in particular a portion of a body of the vehicle as shown at 50. Further, the user 26 may select a surface representing a section of the model to evaluate, such as by drawing a box (not shown) around the desired section of the model to evaluate using a user interactive device 22c such as a mouse. The methodology advances to block 210.

In block 210, the methodology converts the CAD model into a geometric model for analysis using an analysis tool 20. An example of a geometric model is a mesh model, whereby each point representing the model is uniquely identified by a set of coordinates within a known coordinate system. Known mesh formats include STL and NASTRAN. It should be appreciated that computer programs are commercially available for configuring a CAD model as a mesh model. It should also be appreciated that the system may include another type of analysis tool 20 in the form of data manipulation software to facilitate the conversion of the CAD model into a mesh model. In addition, global and local connectivity information between mesh elements can be stored in a sub-library of the vehicle library 14 for quicker direct surface modeling feature creation and manipulation. The methodology advances to block 215.

In block 215, the methodology uses an analysis tool 20 to perform a CAE analysis of the model based on predetermined parameters, to obtain a response of the system. An example of a CAE analysis is an airflow DOE using computational fluid dynamics, as previously described with respect to the prior art. Examples of DOE parameters for the CFD airflow analysis are vehicle drag, lift coefficients and wind noise. Preferably, the response of the CAE analysis is provided to the user in a user-defined format, such as graphically displayed on the display device 24b. The methodology advances to diamond 220.

In diamond 220, the user 26 determines whether to continue the CAE simulation. If the user 26 determines to continue the CAE simulation, the methodology advances to block 225. In block 225, the user 26 selects a design parameter to modify. It is contemplated that the design parameter is representative of a feature located on the surface of the model, such as raised sections or depressions. In particular, a feature refers to a self-contained geometric entity imposed on a base geometry. The design parameter relates to the feature, and modification of the design parameter may affect the mathematical definition of the feature. The methodology advances to block 230.

In block 230, the methodology updates the mesh model in light of the modified DOE parameter, using a mathematical surface modeling technique referred to as Direct Mesh Manipulation, or DMM. In DMM, an entire surface feature is placed on an existing parametric surface as a single geometric entity. After the feature is created, the user can intuitively control its location, shape and continuity independently by adjusting corresponding parameters on a real-time basis. Advantageously, DMM provides for modifications to a mesh model without relying on CAD techniques.

A local region of the surface can be deformed quickly and accurately using direct mesh modeling to change a predetermined DMM feature parameter. An example of a modifiable DMM parameter is adjusting the magnitude or height of the deformation, moving, scaling or reorienting or adjusting the boundary of the deformed region, editing the character of the deformation by changing the underlying DMM basis function and deleting a DMM feature.

An example of a methodology for updating a mesh model using DMM is described in FIG. 4A. Other embodiments of methodologies for updating a mesh model are described further with respect to FIGS. 4B and 4C. It should be appreciated that the user 26 may select the methodology for updating the mesh model depending on the type of feature to be modified. In fact, the user 26 may try more than one methodology and select the one that modifies the feature pursuant to the user's intent. After the mesh model is updated, the methodology returns to block 215 and continues the CAE simulation, such as by performing the DOE analysis on the updated mesh model to generate an updated response.

Returning to diamond 220, if the user 26 does not elect to continue the CAE simulation, the methodology advances to block 235. In block 235, the methodology makes the results of the CAE simulation available for further study and evaluation. The methodology advances to bubble 240 and ends. It should be appreciated that the methodology is executable in an iterative manner, since the user 26 may elect to consider various sets of design parameters as part of a comprehensive study of the vehicle, or compare the results of the methodologies for modifying the feature.

Referring to FIG. 4A, a method of direct mesh manipulation using parametric distribution is illustrated for use in updating an existing mesh model with respect to a modified design parameter. Advantageously, parametric distribution utilizes a potential equation to assign a parameter value and parametric basis functions to determine deformation. A benefit of DMM is that the user 26 can quickly modify a mesh model by adding a feature to it that can be edited or relocated intuitively in real-time. In addition, a family of CAE mesh models can be derived quickly from an existing mesh model. The methodology begins in circle A shown at 300 when called for by block 230 of FIG. 3, and advances to block 305.

In block 305, the methodology imports the mesh model previously selected by the user 26 for modification of the mesh model in light of a modified design parameter. Preferably, the mesh model is a set of polygons, referred to as elements, having a defined order. It should be appreciated that the mesh model is a discrete representation, while the CAD model is a continuous representation. The mesh model includes connectivity and neighbor information for each mesh element. For example, a topological structure of the mesh model can be created by organizing a list of polygons into a connected surface mesh. The mesh is a collection of polygons, describing a surface of a solid object. Preferably, the surface is divided into a large number of polygons, to represent surface details with a certain degree of accuracy. Further, the size of the polygons may not be fixed within all locations on the surface of the model.

Advantageously, the methodology makes assumptions regarding the connectivity of the polygons. Thus, it is assumed that each polygon will have an inside area, neighboring polygons along its edges and each vertex has a set of connected polygons. The methodology also assumes that each polygon will have at most n neighboring polygons, each sharing an entire edge with the polygon, where n is the number of edges in the polygon. The methodology further relies on knowing all the polygons connected to each vertex. It should be appreciated that the model may need to be remeshed to ensure that these conditions are satisfied. The methodology advances to block 310.

Figure 5A:
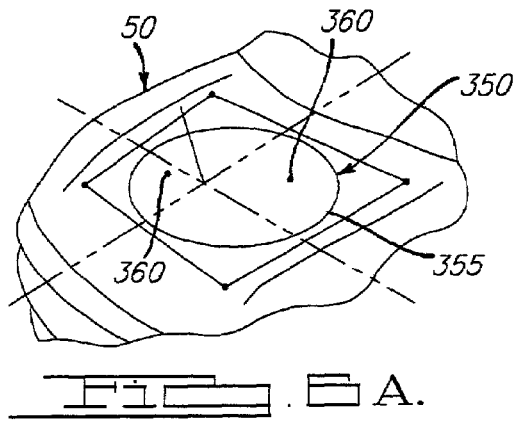
FIGS. 5A–5B are diagrammatic views illustrating a surface feature, according to the method of FIG. 4.

In block 310, the user 26 defines a domain of a feature to be modified. Referring to FIGS. 5A and 6A, the user 26 defines the domain of a selected DMM feature shown at 350 by bounding the feature 350 with a closed curve, as shown at 355. The domain is a mathematical representation of a closed curve, and the boundary of the closed curve 355 defines the area of the domain. In this example, the domain provides a two-dimensional workspace or sketch plane, and the shape of the domain can be convex or nonconvex. The user 26 can define the domain using a known drawing technique, such as by drawing a closed curve around the feature by manipulating the mouse.

The methodology advances to block 315, and the methodology defines the influence geometry or influence center as shown at 360 within the domain of the feature 350. The influence center 360 is a subset of the domain representing an area of maximum displacement. An example of an influence center 360 is a point that will be a peak or trough. Another example of an influence center 360 is an open curve that defines a ridge or crevice, or a closed curve that defines a plateau or valley of the feature. The feature is formed by displacing the surface within the boundary curve along either a prescribed vector or a vector field, such as the normal field of the surface. The methodology advances to block 320.

In block 320, the methodology modifies a mesh of the feature 350 to include nodes at the influence center 360.

The methodology advances to block 325 and models the mesh of the feature 350 as a material that conducts heat. In this example, a linear set of equations to distribute the parameters within the feature are utilized in order to compute the displacement of a point within a feature 350, and the parameter value u corresponding to that point is determined. In this example, the parameter value u equals the temperature of the conductive material at that point.

Previously, u for a simply connected feature 350 with only one influence center 360 was determinable by radial parameterization, wherein a straight line is drawn between the point and the influence center, or through a point perpendicular to the boundary curve. The parameter value u represents the normalized distance along the line between the point and the boundary. It should be appreciated that this method works well provided that the region within the DSM feature is star shaped as shown in FIG. 6B at 375, that is a straight line drawn from any point on the influence center to any point on the boundary does not intersect the boundary more than once, or the influence center more than once. However, the radial parameterization does not provide a good representation of the feature 350 if the domain is non-convex, as shown in FIG. 6C at 380.

In this example, the temperature throughout the mesh of the feature is modeled by the two-dimensional Laplace, or potential, equation. It should be appreciated that the Laplace equation is also used to solve for other problems, such as steady-state temperature in a plate. The Laplace equation relates the scalar value u to the spatial coordinates x and y. It allows u to vary non-linearly with x and y, and ensures that there are no discontinuities in the distribution of u over the domain. In the parameter distribution problem, u represents the value of the parameter at each point p(x,y) within the DSM feature 350.

$$\nabla^2 u = \frac{\partial^2 u}{\partial x^2} + \frac{\partial^2 u}{\partial y^2} = 0$$

The Laplace equation is two-dimensional, but the surface that parameter values are being distributed over typically lies in space. Therefore, the surface is mapped onto a plane, such as by using a parallel projection method, as is known in the art.

Figure 5B:
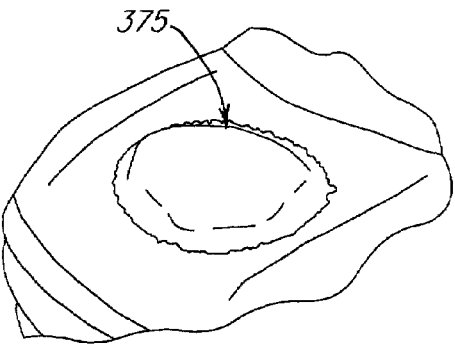
Figure 5C:
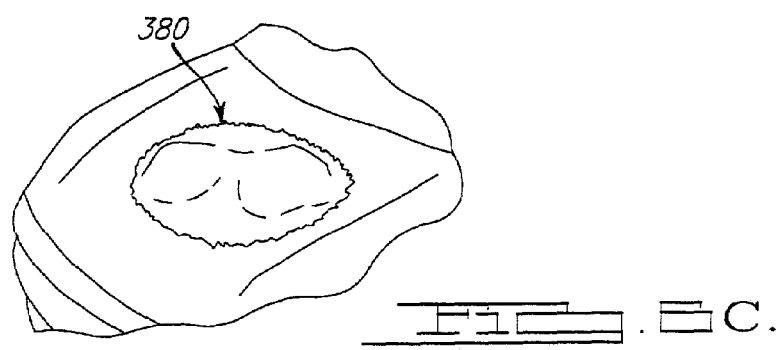

It should be appreciated that when distributing parameter values over a DSM feature 350, at least two boundary conditions need to be satisfied. Referring to FIG. 5B, at the boundary curve of the DSM feature u=0 as shown at 365, and at each of the influence centers u=1, as shown at 370.

The feature 350 is formulated as the Laplace differential equation with Dirichlet boundary conditions.

$$\left.\begin{array}{l}\nabla^2 u = \frac{\partial^2 u}{\partial x^2} + \frac{\partial^2 u}{\partial y^2} = 0; \\ u = 0 \text{(if } (x, y) \text{ is on the boundary);} \\ u = 1 \text{(if } (x, y) \text{ is on an influence center).}\end{array}\right\}$$

It should be appreciated that the Dirichlet equation is a special case of the general Helmholtz equation used to model the temperature distribution in a solid at steady state. The methodology advances to block 330.

In block 330, the methodology solves the Laplace equation to provide the parameter value u at each node in the DMM feature 350. The Laplace equation has closed form solutions when the domain of u is rectangular or circular. A numerical technique such as the finite element method, which is known in the art, is utilized to compute the value of u at specific locations on the DSM feature 350. The finite element method reduces the Laplace equation to a linear system of equations expressed as:

KU=F wherein K is the global conductivity matrix, U is the vector of parameter values at each of the mesh nodes, and F is the heat load vector. The polygonal mesh that defines the geometry of the DMM feature is used to solve the parameter distribution. The methodology uses the equation U=FK$^{-1}$ to solve for the parametric value at each node within the feature 350. Various linear algebra algorithms are known in the art to compute the matrix inverse and solve for U. The methodology advances to block 335.

In block 335, the methodology utilizes the distributed parameter values of u to determine the displacement of the feature surface. For example, the parameter value is used to determine the position of u on a basis function B(u), and the basis function is the scale factor used to compute the magnitude of displacement within a DMM feature. For example, the displacement can be expressed as:

d(u)=B(u)hV, whereby the maximum magnitude h is specified by the user 26, and the direction of the displacement V is determined using known techniques. Advantageously, the basis function provides for simultaneous modification of all vertices of the polygons within the domain in a direct, intuitive and controllable manner. Further, a user 26 can isolate a region on the mesh model, and modification is only made to the interior of the region. Also, transition from the modified region to the rest of the feature is directly controlled by the application of the basis function. The methodology advances to block 340.

In block 340, the surface of the feature is modified by the displacement. For example, points, such as vertices, are moved to their new position. It should be appreciated that the modified feature 350 may be displayed on the display device 24c for evaluation by the user. Advantageously, the feature 350 is remeshed so that the mesh of the modified feature is available for further use or analysis by the user 26. For example, the mesh may be refined by decomposing a mesh element lying across the boundary of a feature or inside a feature. This provides a more accurate representation of the original mesh model and the new features. In another example, the feature 350 is further manipulated, such as by relocating or modifying a point. In still another example, the DMM feature 350 is separated from the original mesh and stored in a DMM feature data sub-library within the vehicle library 14. The DMM feature sub-library contains information relevant to the DMM feature, such as position, orientation and definition. By combining the DMM feature with the original model of the mesh, new mesh models can be automatically created. This storage provision provides for repeatability of the analysis and can be used for archiving features as a template for later use, or for use with another mesh model. The methodology advances to circle 345 and returns to block 230 of FIG. 3.

Figure 4B:
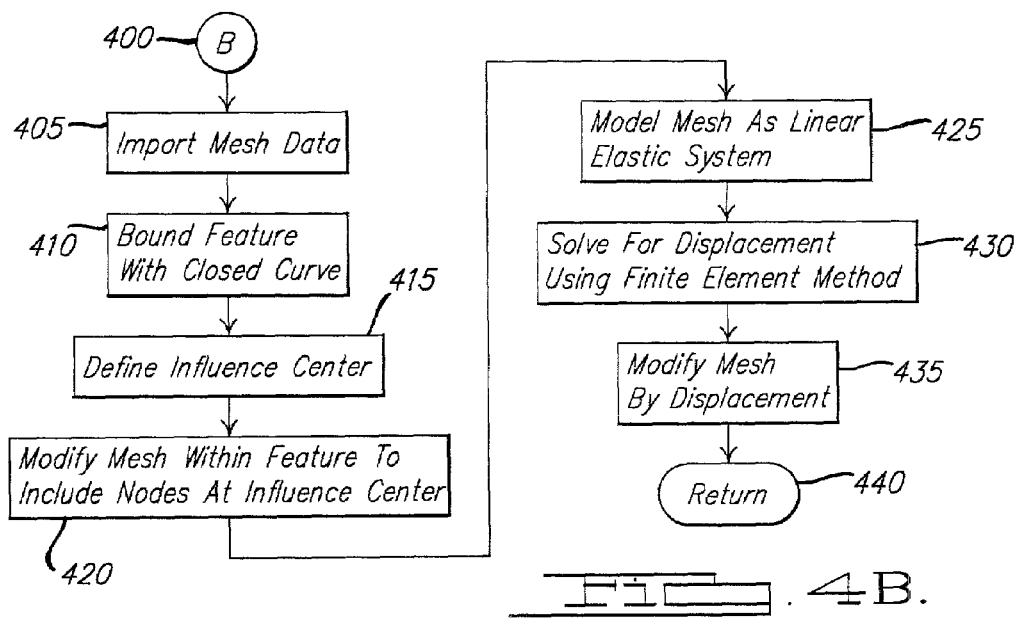

Referring to FIG. 4B, another embodiment of a method of determining deformation in a DMM feature is illustrated for use in updating an existing mesh model using a modified design parameter. Advantageously, the feature is modeled as a sheet constructed of an elastic material that is stretched and then solved for deformations by applying known constitutive, compatibility and equilibrium equations from solid mechanics.

It is known that many materials naturally exhibit linear elastic behavior that can be described mathematically. Advantageously, this method uses linear elastic behavior to mathematically describe deformation of a DMM feature. The methodology begins in circle B shown at 400 when called for by block 230 of FIG. 3, and advances to block 405.

In block 405, the methodology imports the mesh model previously selected by the user 26 for modification of the mesh model in light of a modified design parameter. Preferably, the mesh model is a set of polygons, referred to as elements, having a defined order, as previously described. It should be appreciated that the mesh model is a discrete representation, while the CAD model is a continuous representation. The methodology advances to block 410.

In block 410, the user 26 defines a domain of a feature 350 to be modified. For example, the user 26 defines the domain of a selected DSM feature 350 by bounding the feature with a closed curve 355, as previously described. The domain is a mathematical representation of a closed curve, and the boundary of the closed curve 355 defines the area of the domain. In this example, the domain provides a two-dimensional workspace or sketch plane, and the shape of the domain cam be convex or nonconvex. The user 26 can define the domain using a known drawing technique, such as by drawing a closed curve around the feature using the mouse. The methodology advances to block 415.

In block 415, the methodology defines the influence center 360 within the domain of the feature. The influence center 360 is a subset of the domain representing an area of maximum displacement. An example of an influence center is a point that will be a peak or trough. Another example of an influence center is an open curve that defines a ridge or crevice, or a closed curve that defines a plateau or valley of the feature.

In block 420, the methodology modifies the mesh within the domain of the feature 350 to include nodes at the influence center 360. The methodology advances to block 425.

In block 425, the methodology models the mesh of the feature as a linear elastic material to solve for the displacement of each node within the domain of the feature. It is assumed that the material is homogeneous and isotropic, and that it undergoes small deformations when subjected to a given load applied to its surface. It is understood that a body subjected to an external load either applied to its surface or internal body forces, is in a state of stress. The stress is describable by three normal stress components, and three shear stress components such as:

$$\sigma = \begin{bmatrix} \sigma_{11} \\ \sigma_{22} \\ \sigma_{33} \\ \sigma_{12} \\ \sigma_{23} \\ \sigma_{13} \end{bmatrix}$$

It is also understood that each point in the body will displace a small amount in the three main directions, and this displacement is represented by $u_1$, $u_2$, $u_3$. Strain, as in known in the art, represents the normalized elongation along the three principal directions, or tensile strain, and the normalized rotation of the principal planes in which the point lies, referred to as shear strain. The strain terms can be expressed as a matrix equation:

$$\begin{bmatrix} e_{11} \\ e_{22} \\ e_{33} \\ e_{12} \\ e_{23} \\ e_{13} \end{bmatrix} = \begin{bmatrix} \frac{\partial}{\partial x_1} & 0 & 0 \\ 0 & \frac{\partial}{\partial x_2} & 0 \\ 0 & 0 & \frac{\partial}{\partial x_3} \\ \frac{\partial}{2\partial x_2} & \frac{\partial}{2\partial x_1} & 0 \\ 0 & \frac{\partial}{2\partial x_3} & \frac{\partial}{2\partial x_2} \\ \frac{\partial}{2\partial x_3} & 0 & \frac{\partial}{2\partial x_1} \end{bmatrix} \begin{bmatrix} u_1 \\ u_2 \\ u_3 \end{bmatrix}$$

$\epsilon = BU$ where $\epsilon$ is the strain vector and U is the displacement vector. It should be appreciated that the shear strain terms are approximations based on assumptions of small amounts of deformation.

Stress and strain are related using constitutive equations, as is known in the art. For example, assuming linear elasticity, the stress-strain relationship in matrix notation is:

$\sigma = C\epsilon$ where C is the stiffness matrix, represented here by:

$$C = \begin{bmatrix} \lambda + 2\mu & \lambda & \lambda & 0 & 0 & 0 \\ \lambda & \lambda + 2\mu & \lambda & 0 & 0 & 0 \\ \lambda & \lambda & \lambda + 2\mu & 0 & 0 & 0 \\ 0 & 0 & 0 & 2\mu & 0 & 0 \\ 0 & 0 & 0 & 0 & 2\mu & 0 \\ 0 & 0 & 0 & 0 & 0 & 2\mu \end{bmatrix}$$

Alternatively, Hooke's law can be applied to solve for strain, as follows:

$\epsilon = D\sigma$

In this equation, $D = C^{-1}$, which is also referred to as the compliance matrix. The constants $\mu$ and $\lambda$ seen in the stiffness matrix are referred to in the art as Lame's constants.

It should be appreciated that the values assigned to Lame's constants depend on the material used in the model, and can be experimentally derived.

The equilibrium equations ensure that the object remains at rest and does not move from its fixture when a load is applied to it. For example, equilibrium can be expressed as:

$$\frac{\partial \sigma_{11}}{\partial x_1} + \frac{\partial \sigma_{12}}{\partial x_2} + \frac{\partial \sigma_{13}}{\partial x_3} + p_1 = 0$$

$$\frac{\partial \sigma_{21}}{\partial x_1} + \frac{\partial \sigma_{22}}{\partial x_2} + \frac{\partial \sigma_{23}}{\partial x_3} + p_2 = 0$$

$$\frac{\partial \sigma_{31}}{\partial x_1} + \frac{\partial \sigma_{32}}{\partial x_2} + \frac{\partial \sigma_{33}}{\partial x_3} + p_3 = 0$$

where $p_1$, $p_2$, $p_3$ are applied body forces, such as gravity.

A third set of equations, referred to as the compatibility equations, relate strain to displacement. These equations ensure that two molecules of material remain adjacent to each other despite of the application of a load. An example of compatibility equations are:

$$\frac{\partial^2 e_{11}}{\partial x_2^2} - 2\frac{\partial^2 e_{12}}{\partial x_1 x_2} + \frac{\partial^2 e_{22}}{\partial x_1^2} = 0$$

$$\frac{\partial^2 e_{22}}{\partial x_3^2} - 2\frac{\partial^2 e_{23}}{\partial x_2 x_3} + \frac{\partial^2 e_{33}}{\partial x_{21}^2} = 0$$

$$\frac{\partial^2 e_{11}}{\partial x_3^2} - 2\frac{\partial^2 e_{13}}{\partial x_1 x_3} + \frac{\partial^2 e_{33}}{\partial x_1^2} = 0$$

$$\frac{\partial^2 e_{11}}{\partial x_2 x_3} = \frac{\partial}{\partial x_1}\left(\frac{\partial e_{31}}{\partial x_2} + \frac{\partial e_{21}}{\partial x_3} - \frac{\partial e_{32}}{\partial x_1}\right)$$

$$\frac{\partial^2 e_{22}}{\partial x_1 x_3} = \frac{\partial}{\partial x_2}\left(\frac{\partial e_{23}}{\partial x_1} + \frac{\partial e_{21}}{\partial x_3} - \frac{\partial e_{13}}{\partial x_2}\right)$$

$$\frac{\partial^2 e_{33}}{\partial x_1 x_2} = \frac{\partial}{\partial x_3}\left(\frac{\partial e_{23}}{\partial x_1} + \frac{\partial e_{31}}{\partial x_2} - \frac{\partial e_{12}}{\partial x_3}\right)$$

The methodology advances to block 430.

In block 430, the methodology determines the displacement at each node within the feature 350. In this example, a numerical technique, such as the finite element method, which is known in the art, is utilized to find the displacement. The finite element method reduces the compatibility, equilibrium and constitutive equations to a linear system of equations expressed as:

KU=F wherein K is the global stiffness matrix, U is the vector of displacements at each of the mesh nodes, and F is the force vector. The polygonal mesh that defines the geometry of the DSM feature is used to solve for the displacements. The methodology uses the equation $U=FK^{-1}$ to solve for the displacements at each node within the feature 350. Various linear algebra algorithms are known in the art to compute the matrix inverse and solve for U. It should be noted that in this embodiment, displacement is computed directly. The methodology advances to block 435.

In block 435, the surface of the feature 350 within the domain is modified by the displacement. For example, points, such as vertices, are moved to their new position. It should be appreciated that the modified feature may be displayed on the display device 24b for evaluation by the user 26. The feature 350 is remeshed and the updated mesh model us available for use by the user 26. For example, the mesh may be refined by decomposing a mesh element lying across the boundary of a feature or inside a feature. This provides a more accurate representation of the original mesh model and the new features. In another example, the feature 350 is further manipulated, such as by relocating or modifying a point within the domain. In still another example, the DMM feature 350 is separated from the original mesh and stored in a DMM feature data sub-library within the vehicle library 14. The DMM feature sub-library contains information relevant to the DMM feature, such as position, orientation and definition. By combining the DMM feature with the original model of the mesh, the new mesh's model can be automatically created. This storage provision provides for repeatability of the analysis and can be used for archiving features as a template for later use, or for use with another mesh model. The methodology advances to circle 440 and returns to block 230 of FIG. 3.

Figure 7A:
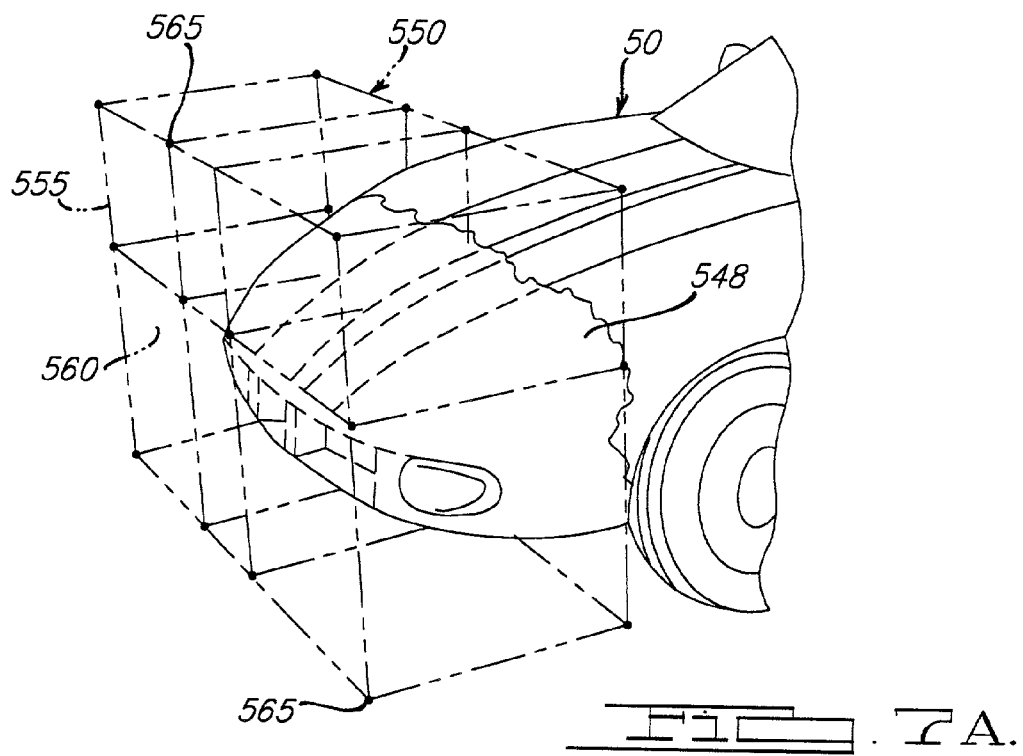
FIGS. 7A–7B are diagrammatic views illustrating direct mesh manipulation of a surface feature using the method of FIG. 4C, according to the present invention.
Figure 7B:
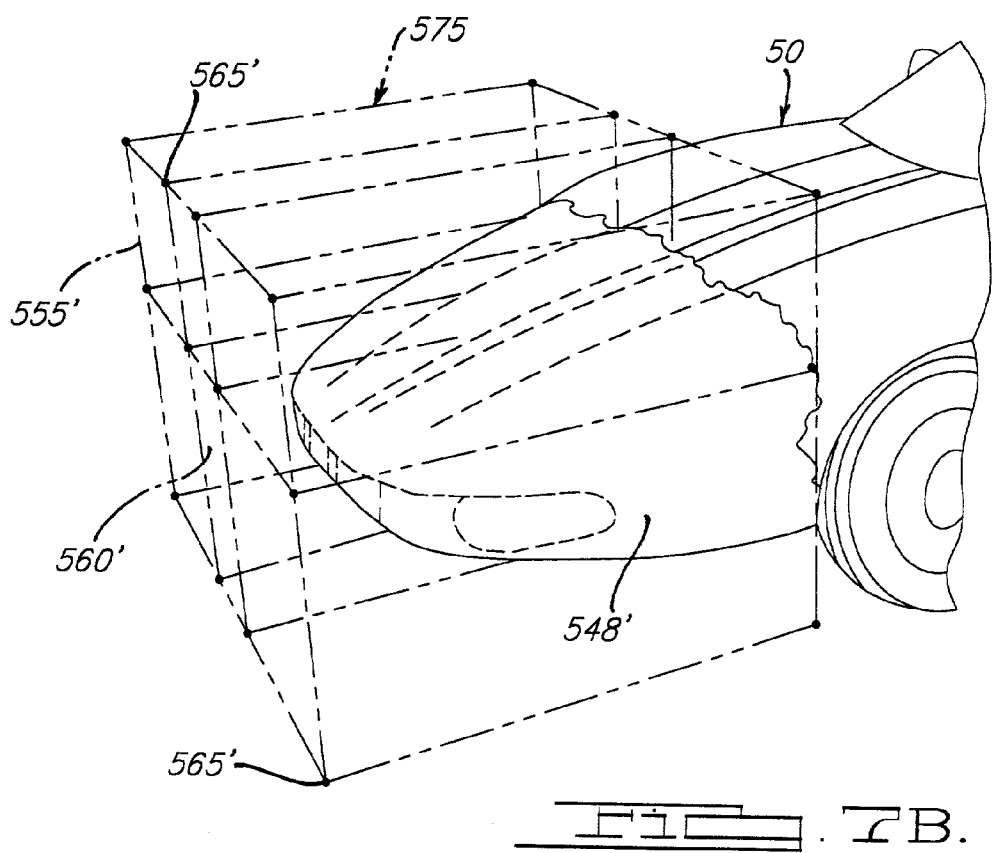

Referring to FIG. 4C, still another embodiment of a method for determining deformation in a DMM feature is illustrated for use in updating an existing mesh model using modified a design parameter. Referring to FIGS. 7A–7B, the region of the mesh to be modified is embedded inside a volume, and the location of each mesh node with respect to the volume is determined. The volume is then deformed and distorted, causing the embedded mesh to also deform. The methodology begins in circle C shown at 500 when called for by block 230 of FIG. 3, and advances to block 505.

In block 505, the methodology imports the mesh model previously selected by the user 26 for modification of the mesh model in light of a modified design parameter. Preferably, the mesh model is a set of polygons, referred to as elements, having a defined order, as previously described. It should be appreciated that the mesh model is a discrete representation, while the CAD model is a continuous representation. The methodology advances to block 510.

In block 510, the user 26 bounds a region of the mesh model containing a feature to be modified, as shown at 548. For example, the user defines the region of a selected DMM feature to modify by bounding the feature 548 with a lattice structure as shown at 550. The lattice structure contains points shown at 565, that can represent a corner or intersection of the lattice. The region is mathematically represented by the lattice structure, and the boundary shown at 555 of the lattice 550 defines the volume 560 of the region. In this example, the volume 560 provides a three-dimensional workspace, and the shape of the feature 548 within the lattice 550 can be convex or nonconvex. The methodology advances to block 515.

In block 515, the methodology determines a position of the surface nodes of the feature 548 with respect to the boundaries 555 of the lattice 550. The methodology advances to block 520.

In block 520, the methodology applies a prescribed displacement to one or more lattice points 565. It is contemplated that the lattice points are either a corner or an intersection. The methodology advances to block 525.

In block 525, the methodology models the volume 560 containing the feature 548 to solve for the displacement of one or more lattice points 565. For example, the volume 560 is modeled as an elastic material that deforms when a lattice point is moved. The equations describing the elastic material are the same as described with respect to FIG. 4B. The methodology advances to block 530.

In block 530, the methodology determines the displacement at each lattice point 565. In this example, a numerical technique such as the finite element method is utilized to find the displacement of the lattice 550.

Since a volume 560' is deformed, the lattice volume is divided into hexahedral finite elements. Preferably, an automatic method of meshing the lattice 550 is utilized in order to compute the deformed lattice shape using the finite element method. Since the lattice 550 is homeomorphic to a cube, the finite element analysis can be done quickly and easily. For example, isoparametric curves can be used in each of the three lattice parameters to construct hexahedral elements through the entire volume. Similarly, the methodology can be applied to non-rectangular lattices, as long as the shape of the lattice is homeomorphic to a simply connected geometric object to make meshing straightforward. For example, the lattice 550 can take on any shape and position with respect to the underlying surface mesh. It should be appreciated that if the lattice 550 is restricted to be a cube or a brick, then an analytic solution for the displacement can be determined.

Once the lattice 550 is meshed, the global stiffness matrix K is formed. Advantageously, the user 26 can experiment with any amount of deformation, until the desired deformed surface mesh is found. Each deformation will make use of the same stiffness matrix. However, if the lattice mesh needs to be refined or recomputed, a new global stiffness matrix is computed.

Preferably, the user 26 specifies predetermined displacements for any point 565 within the lattice 550, though typically it is easier and more intuitive to move only nodes lying on the surface of the lattice 550. It is assumed that lattice surface points 565 that do not have a prescribed displacement are held fixed, though they may be free to rotate about any of the three axes i.e. the points are pinned. The methodology advances to block 535.

In block 535, the methodology determines the displacement for the underlying surface mesh nodes, in order to maintain their position with respect to the deformed lattice boundaries 555'. In general, it cannot be assumed that the surface mesh nodes correspond to lattice mesh nodes. Therefore, the lattice mesh element that a surface mesh node lies within is first isolated, and then the surface mesh node's position within the lattice mesh element is approximated using an interpolation scheme, as is understood in the art. The methodology advances to block 540.

In block 540, the methodology modifies the surface mesh for the feature 548' represented by the displacement at each lattice point 565' and the displacement of the underlying mesh. Preferably, the deformed surface mesh 575 is displayed on the display device 24b, as shown in FIG. 7B. It should be appreciated that like features have like numbers denoted by a prime.

It should be appreciated that the deformation of the underlying surface mesh is directly affected by the quality of the deformed lattice shape. Since lattice deformations tend to be fairly large with respect to the actual lattice size, higher order strain terms may be needed to give more intuitive results. Also, non-linear elasticity can be applied to deform the lattice in order to provide the user 26 with increased control over the deformed mesh shape.

The methodology advances to circle 545 and returns to block 230 of FIG. 3.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A system for direct mesh manipulation of a mesh model for the computer-assisted design of a product comprising:
a computer system, wherein said computer system includes a memory, a processor, a user input device and a display device;
a computer generated geometric model stored in said memory of said computer system, wherein said model is in a computer-aided design (CAD) format; and
a user using the computer system to convert the CAD model into a mesh model, and iteratively evaluate the mesh model until a predetermined response is generated by performing a computer-aided engineering (CAE) analysis of the mesh model, modifying a design parameter based on the CAE analysis, and updating the mesh model to include the modified design parameter by direct mesh manipulation of a surface of the mesh model using Dirichlet parameter distribution to determine deformation of the surface of the mesh model, so that the evaluation of the mesh model is used in the design of the product.

2. A system as set forth in claim 1 wherein the computer system includes a knowledge-based engineering library and the geometric model is stored in the knowledge-based engineering library.

3. A system as set forth in claim 1 wherein the computer system updates the mesh model using direct mesh manipulation, wherein a surface is modeled as a linear elastic sheet to determine deformation of the surface of the mesh model.

4. A system as set forth in claim 1 wherein the computer system updates the mesh model using direct mesh manipulation, by modeling a surface as a lattice structure to determine the deformation of the surface.

5. A method of direct mesh manipulation of a mesh model for the computer-assisted design of a product, said method comprising the steps of:
selecting a geometric model, wherein the model is in a computer-aided design (CAD) format;
converting the CAD model into a mesh model;
iteratively evaluating the mesh model until a predetermined response is generated by:
performing a computer-aided engineering (CAE) analysis of the mesh model;
determining whether to vary a design parameter based on the CAE analysis;
modifying the predetermined design parameter, if determined to vary the design parameter;
updating the mesh model to include the modified design parameter using direct mesh manipulation (DMM) of the mesh model, wherein a surface of the mesh model affected by the modified design parameter is described using a Dirichlet parameter distribution to determine a displacement of the surface; and
modifying the surface of the mesh model by the amount of the displacement; and
using the evaluation of the mesh model in the design of the product.

6. A method as set forth in claim 5 wherein said step of updating a mesh model includes the steps of:
bounding a feature on the surface of the model with a closed curve;
defining an influence center for the feature;
modifying a mesh for the feature to include a node at the influence center; and
applying the Dirichlet parametric distribution to the mesh of the feature to determine displacement of each node within the feature.

7. A method as set forth in claim 6 including the step of using finite element analysis to determine the displacement from the Dirichlet parametric distribution.

8. A method as set forth in claim 6 wherein the maximum displacement of the surface is at the influence center.

9. A method as set forth in claim 6 wherein the feature is a self-contained geometric entity on the surface of the mesh model.

10. A method of direct mesh manipulation of a mesh model for the computer-assisted design of a product, said method comprising the steps of:
selecting a geometric model, wherein the model is in a computer-aided design (CAD) format;
converting the CAD model into a mesh model;
iteratively evaluating the mesh model until a predetermined response is generated by:
performing a computer-aided engineering (CAE) analysis of the mesh model;
determining whether to vary a predetermined design parameter based on the CAE analysis;
modifying the predetermined design parameter, if determined to vary the design parameter;
updating the mesh model to include the modified design parameter using direct surface manipulation (DMM) of the mesh model, wherein a surface of the mesh model is described as an elastic sheet and linear elastic finite element analysis is applied to determine a displacement of the surface; and
modifying the surface of the mesh model by the amount of the displacement; and using the evaluation of the mesh model in the design of the product.

11. A method as set forth in claim 10 wherein said step of updating the mesh model includes the steps of:
bounding a feature on the surface of the model with a closed curve;
defining an influence center for the feature;
modifying a mesh for the feature to include a node at the influence center;
describing the deformed feature as a linear elastic sheet that is stretched; and
determining the displacement of each node in the mesh of the feature using linear elastic finite element analysis.

12. A method as set forth in claim 11 wherein the maximum displacement of the surface is at the influence center.

13. A method as set forth in claim 11 wherein the feature is a self-contained geometric entity on the surface of the mesh model.

14. A method of direct mesh manipulation of a mesh model for the computer-assisted design of a product, said method comprising the steps of:
 selecting a geometric model, wherein the model is in a computer-aided design (CAD) format;
 converting the CAD model into a mesh model;
 iteratively evaluating the mesh model until a predetermined response is generated by:
  performing a computer-aided engineering (CAE) analysis of the mesh model;
  determining whether to vary a predetermined design parameter based on the CAE analysis;
  modifying the predetermined design parameter, if determined to vary the design parameter;
  updating the mesh model to include the modified design criterion using direct surface manipulation (DSM) of the mesh model, wherein a surface of the mesh model is embedded within a lattice structure having a volume, a point within the volume is modified, and finite element analysis is applied to determine a displacement of each node within the lattice; and
  modifying the surface of the mesh model by the amount of the displacement; and using the evaluation of the mesh model in the design of the product.

15. A method as set forth in claim 14 wherein said step of updating the mesh model includes the steps of:
 bounding a region of the mesh containing the surface with a lattice;
 determining a position of a node for the mesh with respect to the lattice boundaries;
 deforming a lattice point a predetermined displacement;
 using linear elastic finite element analysis to determine displacement of the lattice point; and
 determining displacement of mesh nodes within the lattice to maintain their position with respect to the lattice boundary using linear elastic finite element analysis.

16. A method as set forth in claim 15 wherein said lattice point is a corner point of the lattice structure.

17. A method as set forth in claim 15 wherein the lattice point is a point within the interior of the lattice.

18. A method as set forth in claim 15 wherein the feature is a self-contained geometric entity on the surface of the mesh model.

* * * * *